(12) United States Patent
Mitumori

(10) Patent No.: US 8,391,287 B2
(45) Date of Patent: Mar. 5, 2013

(54) PACKET RELAY METHOD AND DEVICE

(75) Inventor: Yasuyuki Mitumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 701 days.

(21) Appl. No.: 12/153,894

(22) Filed: May 27, 2008

(65) Prior Publication Data

US 2008/0298365 A1 Dec. 4, 2008

(30) Foreign Application Priority Data

May 30, 2007 (JP) .................................. 2007-144083

(51) Int. Cl.
*H04L 12/28* (2006.01)
(52) U.S. Cl. ....................................... 370/390; 370/401
(58) Field of Classification Search .................... None
See application file for complete search history.

(56) References Cited

U.S. PATENT DOCUMENTS

| | | | | |
|---|---|---|---|---|
| 5,179,554 | A * | 1/1993 | Lomicka et al. ............. | 370/257 |
| 6,952,396 | B1 * | 10/2005 | Cottreau et al. .............. | 370/222 |
| 7,342,877 | B1 * | 3/2008 | Ervin et al. ................... | 370/225 |
| 7,639,674 | B2 * | 12/2009 | Yeh et al. ....................... | 370/389 |
| 2002/0191584 | A1 * | 12/2002 | Korus et al. ................... | 370/349 |
| 2004/0017184 | A1 | 1/2004 | Shen et al. | |
| 2004/0062233 | A1 * | 4/2004 | Brown .......................... | 370/352 |
| 2005/0094554 | A1 * | 5/2005 | Nakash .......................... | 370/351 |
| 2005/0169270 | A1 * | 8/2005 | Mutou et al. ................... | 370/390 |
| 2006/0109802 | A1 * | 5/2006 | Zelig et al. .................... | 370/258 |
| 2006/0159009 | A1 * | 7/2006 | Kim et al. ...................... | 370/216 |
| 2006/0221975 | A1 * | 10/2006 | Lo et al. ......................... | 370/390 |
| 2007/0110025 | A1 * | 5/2007 | Guichard et al. ............. | 370/351 |
| 2007/0121615 | A1 * | 5/2007 | Weill et al. ..................... | 370/389 |
| 2007/0147279 | A1 * | 6/2007 | Smith et al. ................... | 370/316 |
| 2007/0189291 | A1 * | 8/2007 | Tian ............................... | 370/390 |
| 2007/0242604 | A1 * | 10/2007 | Takase et al. .................. | 370/223 |
| 2008/0259920 | A1 * | 10/2008 | Cheng et al. ................... | 370/390 |
| 2008/0279196 | A1 * | 11/2008 | Friskney et al. ........... | 370/395.53 |
| 2009/0010154 | A1 | 1/2009 | Martinotti et al. | |

FOREIGN PATENT DOCUMENTS

| | | |
|---|---|---|
| JP | 03-076338 | 4/1991 |
| JP | 2001-127782 | 5/2001 |
| JP | 2004-242194 | 8/2004 |
| JP | 2007-282153 | 10/2007 |
| JP | 2010-515314 | 5/2010 |

OTHER PUBLICATIONS

Japanese Office Action dated Jun. 28, 2011 issued in corresponding Japanese Patent Application No. 2007-144083.

* cited by examiner

*Primary Examiner* — Gregory Sefcheck
*Assistant Examiner* — Joshua Smith
(74) *Attorney, Agent, or Firm* — Staas & Halsey LLP

(57) ABSTRACT

A node according to a packet relay method which enables a multicast transfer or broadcast transfer of a packet effectively is provided. When the node receives a packet set with a multicast address or broadcast address as a destination address from a source client, the packet is added with an MPLS label common to destination clients corresponding to the multicast address or all destination clients corresponding to the broadcast address. The packet added with the common MPLS label is transferred over a ring network. When receiving the packet from a ring network, the node removes a common MPLS label from the received packet to be transmitted to destination clients when it detects that the common MPLS label is added to the received packet.

30 Claims, 20 Drawing Sheets

TBL1

| MAC ADDRESS TABLE EXAMPLE | | |
|---|---|---|
| DESTINATION CLIENT MAC ADDRESS DA_CL | LABEL LB | VALID/INVALID FLAG VLD |
| 00-00-00-00-11-11 | 1 (INDIVIDUAL LABEL LB_1) | 1 (VALID) |
| 00-00-00-00-22-22 | 2 | 1 |
| 00-00-00-00-33-33 | 3 | 1 |
| 00-00-00-00-44-44 | 4 | 0 (INVALID) |
| . . . | . . . | . . . |
| 80-00-00-00-77-77 (MULTICAST ADDRESS) | 100 (COMMON LABEL B_C) | 1 |
| . . . | . . . | . . . |

FIG.2

TBL1

| MAC ADDRESS TABLE EXAMPLE |||
|---|---|---|
| DESTINATION CLIENT MAC ADDRESS DA_CL | LABEL LB | VALID/INVALID FLAG VLD |
| 00-00-00-00-11-11 | 1 (INDIVIDUAL LABEL LB_I) | 1 (VALID) |
| 00-00-00-00-22-22 | 2 | 1 |
| 00-00-00-00-33-33 | 3 | 1 |
| 00-00-00-00-44-44 | 4 | 0 (INVALID) |
| ⋮ | ⋮ | ⋮ |
| 80-00-00-00-77-77 (MULTICAST ADDRESS) | 100 (COMMON LABEL B_C) | 1 |
| ⋮ | ⋮ | ⋮ |

FIG.6

TBL1

| MODIFIED MAC ADDRESS TABLE EXAMPLE | | |
|---|---|---|
| DESTINATION CLIENT MAC ADDRESS DA_CL | LABEL LB | VALID/INVALID FLAG VLD |
| 00-00-00-00-11-11 | 1 (INDIVIDUAL LABEL LB_I) | 1 (VALID) |
| 00-00-00-00-22-22 | 2 | 1 |
| 00-00-00-00-33-33 | 3 | 1 |
| 00-00-00-00-44-44 | 4 | 0 (INVALID) |
| ⋮ | ⋮ | ⋮ |
| 80-00-00-00-77-77 (MULTICAST ADDRESS) | 100 (COMMON LABEL LB_C) | 1 |
| FF-FF-FF-FF-FF-FF (BROADCAST ADDRESS) | 400 (COMMON LABEL) | 1 |
| ⋮ | ⋮ | ⋮ |

FIG.7

TBL3a

| RPR MULTICAST/BROADCAST TABLE EXAMPLE ||||
|---|---|---|---|
| COMMON LABEL LB_C | RPR NODE MAC ADDRESS RA | TRANSMISSION/ RECEPTION FLAG FLG | VALID/INVALID FLAG VLD |
| 100 | 80-00-00-00-77-77 | 1 (TRANSMISSION) | 1 (VALID) |
| 100 | 80-00-00-00-77-77 | 0 (RECEPTION) | 1 |
| 200 | 80-00-00-00-00-03 | 0 | 0 (INVALID) |
| 300 | 80-00-00-00-00-04 | 0 | 0 |
| 400 | FF-FF-FF-FF-FF-FF (BROADCAST ADDRESS) | — | 1 |
| ⋮ | ⋮ | ⋮ | ⋮ |

FIG.8

TBL4

| RPR TABLE EXAMPLE |||| 
|---|---|---|---|
| LABEL LB | RPR NODE MAC ADDRESS RA | TRANSMISSION/ RECEPTION FLAG FLG | VALID/INVALID FLAG VLD |
| 1 (INDIVIDUAL LABEL LB_I) | 00-00-00-00-00-01 | 1 (TRANSMISSION) | 1 (VALID) |
| 2 | 00-00-00-00-00-02 | 1 | 1 |
| 3 | 00-00-00-00-00-03 | 1 | 1 |
| 4 | 00-00-00-00-00-04 | 0 (RECEPTION) | 0 (INVALID) |
| ⋮ | ⋮ | ⋮ | ⋮ |
| 100 (COMMON LABEL LB_C) | 80-00-00-00-77-77 | 1 | 1 |
| 100 | 80-00-00-00-77-77 | 0 | 1 |
| 200 | 80-00-00-00-00-03 | 0 | 0 |
| 300 | 80-00-00-00-00-04 | 0 | 0 |
| ⋮ | ⋮ | ⋮ | ⋮ |

FIG.9

TBL4

| \multicolumn{6}{c}{MODIFICATION (1) OF RPR TABLE} |
|---|---|---|---|---|---|

| LABEL LB | RPR NODE MAC ADDRESS RA | TRANSMISSION/ RECEPTION FLAG FLG | VALID/INVALID FLAG VLD | EAST SIDE TRANSFER FLAG TRE | WEST SIDE TRANSFER FLAG TRW |
|---|---|---|---|---|---|
| . . . | . . . | . . . | . . . | . . . | . . . |
| 100 | 80-00-00-00-77-77 | 1 (TRANSMISSION) | 1 (VALID) | 1 (TRANSFER) | 0 (NON-TRANSFER) |
| 100 | 80-00-00-00-77-77 | 0 (RECEPTION) | 1 | 1 | 0 |
| 200 | 80-00-00-00-00-03 | 0 | 1 | 0 | 1 |
| 300 | 80-00-00-00-00-04 | 0 | 1 | 0 | 1 |
| . . . | . . . | . . . | . . . | . . . | . . . |

FIG.10

TBL4

| MODIFICATION (2) OF RPR TABLE | | | | | | |
|---|---|---|---|---|---|---|
| LABEL LB | RPR NODE MAC ADDRESS RA | TRANSMISSION/ RECEPTION FLAG FLG | VALID/ INVALID FLAG VLD | EAST SIDE TRANSFER FLAG TRE | WEST SIDE TRANSFER FLAG TRW | HASH FUNCTION FLAG HSH |
| . . . | . . . | . . . | . . . | . . . | . . . | . . . |
| 100 | 80-00-00-00-77-77 | 1 (TRANSMISSION) | 1 (VALID) | 0 (NON-TRANSFER) | 0 | 1 (VALID) |
| 100 | 80-00-00-00-77-77 | 0 (RECEPTION) | 1 | 0 | 0 | 0 (INVALID) |
| 200 | 80-00-00-00-00-03 | 0 | 1 | 0 | 1 | 0 |
| 300 | 80-00-00-00-00-04 | 0 | 1 | 1 | 0 | 0 |
| . . . | . . . | . . . | . . . | . . . | . . . | . . . |

FIG.11

TBL4

| MODIFICATION (3) OF RPR TABLE | | | | | | |
|---|---|---|---|---|---|---|
| LABEL LB | RPR NODE MAC ADDRESS RA | TRANSMISSION/ RECEPTION FLAG FLG | VALID/ INVALID FLAG VLD | EAST SIDE TRANSFER FLAG TRE | WEST SIDE TRANSFER FLAG TRW | HASH FUNCTION FLAG HSH |
| . . . | . . . | . . . | . . . | . . . | . . . | . . . |
| 100 | 80-00-00-00-77-77 | 1 (TRANSMISSION) | 1 (VALID) | 1 (TRANSFER) | 0 (NON-TRANSFER) | 0 (INVALID) |
| 100 | 80-00-00-00-77-77 | 0 (RECEPTION) | 1 | 1 | 0 | 0 |
| 200 | 80-00-00-00-00-03 | 1 | 1 | 0 | 0 | 1 (VALID; FUNCTION EXP1) |
| 300 | 80-00-00-00-00-04 | 1 | 1 | 0 | 0 | 2 (VALID;EXP2) |
| . . . | . . . | . . . | . . . | . . . | . . . | . . . |

FIG.12

TBL4

MODIFICATION (4) OF RPR TABLE

| LABEL LB | RPR NODE MAC ADDRESS RA | TRANSMISSION/ RECEPTION FLAG FLG | VALID/ INVALID FLAG VLD | EAST SIDE TRANSFER FLAG TRE | TTL SETTING (EAST SIDE) SET_E | WEST SIDE TRANSFER FLAG TRW | TTL SETTING (WEST SIDE) SET_W |
|---|---|---|---|---|---|---|---|
| ... | ... | ... | ... | ... | ... | ... | ... |
| 100 | 80-00-00-00-77-77 | 1 (TRANSMISSION) | 1 (VALID) | 1 (TRANSFER) | 3 | 0 (NON-TRANSFER) | 0 |
| 100 | 80-00-00-00-77-77 | 0 (RECEPTION) | 1 | 0 | — | 0 | — |
| 200 | 80-00-00-00-00-03 | 0 | 0 | ... | — | 1 | — |
| ... | ... | ... | ... | ... | ... | ... | ... |

FIG.13

TBL4

MODIFICATION (5) OF RPR TABLE

| LABEL LB | RPR NODE MAC ADDRESS RA | TRANSMISSION/ RECEPTION FLAG FLG | VALID/ INVALID FLAG VLD | EAST SIDE TRANSFER FLAG TRE | TTL SETTING (EAST SIDE) SET_E | WEST SIDE TRANSFER FLAG TRW | TTL SETTING (WEST SIDE) SET_W | HASH FUNCTION FLAG HSH |
|---|---|---|---|---|---|---|---|---|
| ... | ... | ... | ... | ... | ... | ... | ... | ... |
| 100 | 80-00-00-00-77-77 | 1 (TRANSMISSION) | 1 (VALID) | 1 (TRANSFER) | 3 | 0 (NON-TRANSFER) | 0 | 0 (INVALID) |
| 100 | 80-00-00-00-77-77 | 0 (RECEPTION) | 1 | 0 | — | 0 | — | 0 |
| 200 | 80-00-00-00-00-03 | 1 | | | | | — | 1 (VALID) |
| ... | ... | ... | ... | ... | ... | ... | ... | ... |

FIG.14

TBL4

MODIFICATION (6) OF RPR TABLE

| LABEL LB | RPR NODE MAC ADDRESS RA | TRANSMISSION/ RECEPTION FLAG FLG | VALID/ INVALID FLAG VLD | EAST SIDE TRANSFER FLAG TRE | TTL SETTING (EAST SIDE) SET_E | WEST SIDE TRANSFER FLAG TRW | TTL SETTING (WEST SIDE) SET_W |
|---|---|---|---|---|---|---|---|
| ... | ... | ... | ... | ... | ... | ... | ... |
| 100 | 80-00-00-00-00-77-77 | 1 (TRANSMISSION) | 1 (VALID) | 1 (TRANSFER) | 3 | 0 (NON-TRANSFER) | 0 |
| 100 | 80-00-00-00-00-77-77 | 0 (RECEPTION) | 1 | 1 | — | 0 | — |
| 200 | 80-00-00-00-00-00-03 | 1 | 1 | 1 | 2 | 1 | 2 |
| ... | ... | ... | ... | ... | ... | ... | ... |

FIG.18

PRIOR ART

TBL1a

| MAC ADDRESS TABLE EXAMPLE | | |
|---|---|---|
| DESTINATIONCLIENT MACADDRESS DA_CL | LABEL LB | VALID/INVALID FLAG VLD |
| 00-00-00-00-11-11 | 1 | 1 (VALID) |
| 00-00-00-00-22-22 | 2 | 1 |
| 00-00-00-00-33-33 | 3 | 1 |
| 00-00-00-00-44-44 | 4 | 0 (INVALID) |
| ⋮ | ⋮ | ⋮ |
| 80-00-00-00-77-77 (MULTICAST ADDRESS) | 1, 2, 3 | 1 |
| ⋮ | ⋮ | ⋮ |

FIG.20

TBL2

| RPR UNICAST TABLE EXAMPLE | | |
|---|---|---|
| LABEL LB | RPR NODE MAC ADDRESS RA | VALID/INVALID FLAG VLD |
| 1 | 00-00-00-00-00-01 | 1 (VALID) |
| 2 | 00-00-00-00-00-02 | 1 |
| 3 | 00-00-00-00-00-03 | 1 |
| 4 | 00-00-00-00-00-04 | 0 (INVALID) |
| ⋮ | ⋮ | ⋮ |

PACKET RELAY METHOD AND DEVICE

BACKGROUND OF THE INVENTION

1. Field of the Invention

The present invention relates to a packet relay method and device, and in particular to a packet relay method and device using a ring network based on RPR (Resilient Packet Ring) system as a relay network within an MPLS (Multi Protocol Label Switching) network.

2. Description of the Related Art

FIG. 15 shows a configuration of an RPR ring network (hereinafter, simply referred to as a ring network) generally known in the art. As shown, this ring network NW is composed of RPR nodes 1A-1E (hereinafter, occasionally represented by reference numeral 1) connected in a ring shape with a transmission line L within an MPLS network. The RPR nodes 1A-1E are respectively connected to client terminals 2A-2E (hereinafter, occasionally represented by reference numeral 2) outside the MPLS network.

Between the RPR nodes, a virtual path called an LSP (Label Switching Path) is set up on a point-to-point basis, each LSP being assigned with a label LB for mutual identification. Taking the RPR node 1A as an example, between the RPR node 1A and the RPR nodes 1B-1E, virtual paths LSP1-LSP4 are set up as shown, to which labels LB1-LB4 are assigned for the identification of the virtual paths LSP1-LSP4. While not shown, between other RPR nodes, virtual paths LSP are set up on a point-to-point basis.

The RPR nodes 1A-1E and the client terminals 2A-2E respectively have unique MAC address RA and CA (both in a hexadecimal notation).

Hereinafter, an arrangement of the prior art RPR node and its packet relaying operation will be specifically described preferring to FIGS. 16-20.

Composition of Prior Art RPR Node: FIG. 16

The prior art RPR node 1 shown in FIG. 16 is composed of an RPR card 10 as an interface with the ring network NW, LAN cards 20_1-20_n (hereinafter, occasionally represented by reference numeral 20) as an interface with each of client terminals 2_1-2_n, an SW card 30 for making switching operations between the RPR card 10-LAN card 20, and a CPU 40 for controlling the cards 10-30. The blocks 10_40 are mutually connected with a common bus.

The RPR card 10 comprises a MAC layer portion 11 which receives e.g. an Ethernet (registered trademark) packet PE through the LAN card 20 from the client terminal 2 and acquires a label LB corresponding to a destination client terminal MAC address DA_CL set in the packet PE from a MAC address table TBL1a; an MPLS layer portion 12 which receives the Ethernet packet PE and the label LB from the MAC layer portion 11 to generate an MPLS packet PM; an RPR layer portion 13 which acquires a destination (destination to be relayed) RPR node MAC address DA_ND corresponding to the label LB in the MPLS packet PM provided as an output by the MPLS layer portion 12 from an RPR unicast table TBL2 and adds to the MPLS packet PM an RPR header in which the address DA_ND and its own node MAC address etc. are set to generate an RPR packet PR; PHY portions 14_E-14_W (hereinafter, occasionally represented by reference numeral 14) which transfer the RPR packet RP provided as an output by the RPR layer portion 13 to the ring network NW from an East side (exit) and a West side (exit) of this node.

Next, a packet relaying operation of this RPR node 1 will be described referring to FIGS. 16-20.

Packet Relaying Example of Prior Art RPR Node: FIGS. 16-20

For the relaying operation of the Ethernet packet PE received from the client terminal 2, it is possible for the RPR node 1 to perform (1) a unicast transfer operation, (2) a multicast transfer operation, and (3) a broadcast transfer operation as described in the following (see, Patent document 1):

(1) Unicast Transfer Operation: FIGS. 16-20

Taking a case where the Ethernet packet PE is transferred between the client terminals 2A and 2C (namely, the RPR packet PR is transferred between the RPR nodes 1A and 1C in a unicast) for example, as shown in FIG. 17, the MAC layer portion 11 (see FIG. 16) in the RPR node 1A receives the Ethernet packet PE from the client terminal 2A through the LAN card 20.

The Ethernet packet PE is, as shown in FIG. 17, composed of a destination client terminal MAC address DA_CL of 6 bytes, a source client terminal MAC address SA_CL of 6 bytes, a user data SDU (Service Data Unit) of N bytes (variable length), and FCS (Frame Check Sequence) of 4 bytes. In this example, as shown in FIG. 15, the addresses DA_CL and SA_CL are respectively set with a MAC address "00-00-00-00-22-22" of the client terminal 2C and a MAC address "00-00-00-00-55-55" of the client terminal 2A.

The MAC layer portion 11 acquires from the MAC address table TBL1a a label LB corresponding to the client terminal MAC address DA_CL="00-00-00-00-22-22" in the Ethernet packet PE.

In the table TBL1a, as shown in FIG. 18, the destination client terminal MAC address DA_CL with reference to the RPR node 1A, namely MAC addresses "00-00-00-00-11-11", "00-00-00-00-22-22", "00-00-00-00-33-33", and "00-00-00-00-44-44" of the client terminals 2B-2D are stored in association with label values "1"-"4" of the labels LB1-LB4 shown in FIG. 15. Also, the table TBL1a includes a valid/invalid flag VLD indicating whether or not a packet transfer with respect to each destination client terminal MAC address DA_CL is valid, in which the MAC layer portion 11 acquires the label LB from the table TBL1a when the flag VLD is "1 (valid)". A multicast address "80-00-00-00-77-77" is also shown in the table TBL1a, which will be described in the following (2).

The valid-invalid flag VLD corresponding to the destination client terminal MAC address DA_CL="00-00-00-00-22-22" is now set to "1", so that the MAC layer portion 11 acquires the label value "2" of the label LB2 to be provided to the MPLS layer portion 12 together with the Ethernet packet PE.

The MPLS layer portion 12, as shown in FIG. 17, adds an MPLS header HD1 of 4 bytes including the above noted label LB2 to the Ethernet packet PE to generate an MPLS packet PM to be provided to the RPR layer portion 13.

The above noted MPLS header HD1 is, as shown in FIG. 19, composed of a label field F1 of 20 bits, an EXP field F2 of 3 bits, an S field F3 of 1 bit, and a TTL field F4 of 8 bits. The label field F1 is set with the label value "2" of the label LB2 in the MPLS layer portion 12. The EXP field F2 is an experimental use area which is set with CoS (Class of Service) in recent years. The S field F3 is an area for setting a terminal identifier where the MPLS header HD1 has a stack arrangement, the TTL (Time To Live) field F4 is an area for setting an allowable life time of the MPLS packet PM in the MPLS network, where the RPR mode 1 does not use the TTL field F4.

As shown in FIG. 17, the RPR layer portion 13 generates an RPR packet PR in which the MPLS packet PM is added with an RPR header HD2, and transfers it to the ring network NW from East side of the RPR node 1A (route to the RPR node 1C through the RPR node 1B) through e.g. the PHY portion 14_E. It is here assumed that a transferring direction (East side, West side) of the RPR packet PR to the ring network NW is predetermined by a maintenance person etc.

The above noted RPR header HD2 is composed of an allowable life time TTL (1 byte) of the RPR packet PR on the ring network NW as shown, an area Base Control (1 byte) for storing control information, a MAC address DA_ND (6 bytes) of the destination RPR node, a MAC address SA_ND (6 bytes) of the destination RPR node, an area TTL B ase (1 byte) for storing an initial setting of the allowable life time TTL, an area Extended Control (1 byte) for storing Extended Control information, and an area HEC (Header Error Control; 4 bytes) for storing error correcting control information. The RPR layer portion 13 sets a MAC address "00-00-00-00-00-00" and "255" (expressable maximum value with 1 byte) of the RPR node 1A respectively in the address SA_ND and allowable life time TTL.

Also, the RPR layer portion 13 acquires the MAC address DA_ND of the destination RPR node corresponding to the label LB2 from the RPR unicast table TBL2 and sets it in the RPR header HD2.

In the table TBL2, as shown in FIG. 20, the label values "1"-"4" of the labels LB1-LB4 shown in FIG. 15 are stored in association with MAC addresses "00-00-00-00-00-01", "00-00-00-00-00-02", "00-00-00-00-00-03", and "00-00-00-00-00-04" of the RPR nodes 1B-1E, respectively. Also, the table TBL2 includes a valid/invalid flag VLD indicating whether or not a transfer of the RPR packet PR to the ring network NW is valid, in which the RPR layer portion 13 acquires an RPR node MAC address RA as the destination RPR node MAC address DA_ND from the table TBL2 when the flag VLD is "1 (valid)".

The valid/invalid flag VLD corresponding to the label value "2" of the label LB2 is now set to "1", so that the RPR layer portion 13 acquires the MAC address "00-00-00-00-00-02" of the RPR node 1C as the destination RPR node MAC address DA_ND and sets it in the RPR header HD2.

The RPR layer portion 13 within the RPR node 1B having received from its West side the RPR packet ER thus transferred over the ring network NW refers to the destination RPR node MAC address DA_ND in the RPR header HD2 of the RPR packet PR. Since this address DA_ND "00-00-00-00-00-02" does not indicate its own node MAC address "00-00-00-00-00-01", the RPR node 1B does not transmit the RPR packet PR to the client terminal 2B connected to the node 1B, but further transfers to the ring network NW from the opposite side (East side) to the receiving side (West side). At this time, the RPR layer portion 13 decrements the allowable life time TTL in the RPR header HD2 by "1".

The RPR layer portion 13 in the RPR node 1C having received the RPR packet PR transferred from the RPR node 1B refers to the destination RPR node MAC address DA_ND in the RPR header HD2, which indicates its own node MAC address "00-00-00-00-00-02", so that the RPR layer portion 13 provides the MPLS packet PM obtained by removing the RPR header HD2 from the RPR packet PR to the MPLS layer portion 12.

The MPLS layer portion 12 provides the Ethernet packet PE obtained by removing the MPLS header HD1 from the MPLS packet PM to the MAC layer portion 11. The MAC layer portion 11 provides the Ethernet packet PE to an SW card 30 for the switching. Since the destination client MAC address DA_CL in the Ethernet packet PE is set with the MAC address "00-00-00-00-22-22" of the client terminal 2C, the SW card 30 transmits the Ethernet packet PE to the client terminal 2C through the LAN card 20.

Thus, it becomes possible to transfer the Ethernet packet PE received from the client terminal 2A to the client terminal 2C in unicast mode.

The value of the allowable life time TTL in the above noted RPR header HD2 is to be decremented by "1" every time the packet passes through the RPR node 1 on the ring network NW as described above, so that the RPR node 1 having received the RPR packet in the state of the allowable life time TTL "1" (namely, state where the life time of the RPR packet PR on the ring network NW reaches an allowable time period) does not transfer the received RPR packet PR to the ring network NW. When the MAC address SA_ND of the source RPR node in the RPR header HD2 of the received RPR packet PR coincides with its own node MAC address, the RPR node 1 finds that the RPR packet PR transmitted from the node 1 itself goes around the ring network NW and has returned, and discards the received RPR packet PR.

(2) Multicast Transfer Operation: FIGS. 18 and 20

In the MAC address table TBL1a shown in FIG. 18, as described above, the multicast address "80-00-00-00-77-77" (where "1" is set at the most significant bit) is stored in association with the label values "1"-"3" of the labels LB1-LB3 respectively of the destination client terminals 2B-2D corresponding to that multicast address. When the destination client terminal MAC address DA_CL in the Ethernet packet PE received from the client terminal 2A is "80-00-00-00-77-77", the MAC later portion 11 in the RPR node 1A acquires the label values "1"-"3" of the labels LB1-LB3 from the table TBL1a.

Then, the MAC layer portion 11 copies the received Ethernet packet PE to assume 3 that is the number of destinations, for the number of label values together with the label values "1"-"3" to be provided to the MPLS layer portion 12.

The MPLS layer portion 12 adds the MPLS header HD1 set with the label values "1"-"3" to each Ethernet packet PE to generate 3 MPLS packets PM to be provided to the RPR layer portion 13.

The RPR layer portion 13 acquires the MAC addresses "00-00-00-00-00-01", "00-00-00-00-00-02", and "00-00-00-00-00-03" of the RPR nodes 1B-1D respectively corresponding to the label values "1"-"3" from the RPR unicast table TBL2 shown in FIG. 20, and the RPR header HD2 in which those MAC addresses are set as the destination RPR node MAC address DA_ND to each MPLS packet PM to generate 3 RPR packets PM to be transferred to the ring network NW through the PHY portion 14.

The RPR nodes 1B-1D having received the RPR packet PR transferred to the ring network NW as described above obtains the Ethernet packet PE from the RPR packet PR in the same way as the above unicast transfer operation to be transferred to the client terminals 2B-2D.

Thus, it becomes possible to transfer the Ethernet packet PE received from the client terminal 2A to the client terminals 2B-2D in multicast mode.

(3) Broadcast transfer operation: Not shown

When the destination client terminal MAC address DA_CL in the Ethernet packet PE received from the client terminal 2A is a broadcast address (not shown), the RPR node 1A acquires the label values "1"-"4" of the labels LB1-LB4 from the MAC address TBL1a shown in FIG. 18.

The RPR node 1A then generates 4 RPR packets PR (namely, RPR packets PR addressed to all of the RPR nodes 1B-1E) in the same way as the multicast transfer operation to be transferred to the ring network NW through the PHY portion 14.

The RPR nodes 1B-1E having received the RPR packet PR thus transferred to the ring network NW obtains the Ethernet packet PE from the RPR packet PR in the same way as the above unicast transfer operation to be transmitted to the client terminals 2B-2E.

Thus it becomes possible to transfer the Ethernet packet PE received from the client terminal 2A to all of the client terminals 2B-2E in broadcast mode.

In case where the ring network NW is composed of label switching routers etc., the MPLS packet PM is transferred to the ring network NW for the relaying operations based on the label LB set in the MPLS header HD1. Also in this case, upon the multicast transfer or broadcast transfer, copying the Ethernet packet PE is performed in the same way as the above.

[Patent document 1] Japanese Patent Application Laid-Open No. 2004-242194

The above prior art has a problem that upon transferring a packet received from a client terminal to a ring network in multicast mode or broadcast mode, the packet is copied by the number of destination client terminals corresponding to the multicast address or broadcast address, so that the processing load within the RPR node caused by such copying is high.

Particularly, in case where the number of the RPR nodes composing the ring network is numerous, the copying processes of packet are congested, resulting in occurrence of defects or losses of the packet received from the client terminals.

Also, it has another problem that packets of the number of destination client terminals are to be transferred over the ring network, introducing a high bandwidth load.

SUMMARY

It is accordingly an object of the present invention to provide a packet relay method and device which enable a multicast transfer or broadcast transfer of a packet effectively.

[1] In order to achieve the above as mentioned object, a packet relay method (or device) according to one aspect of an embodiment comprises: a first step of (or portion) adding to a packet, when the packet having a multicast address or broadcast address set therein as a destination address is received from a source client, an MPLS label common to destination clients corresponding to the multicast address or all destination clients corresponding to the broadcast address; and a second step of (or portion) transferring the packet added with the common MPLS label over a ring network.

Namely, on a transmission side of a packet, a packet to be transferred in multicast mode or broadcast mode is added with an MPLS label common to destination clients and transferred to a ring network.

On a receiving side of a packet, by detecting the packet received from the ring network being added with the common MPLS label, the packet can be transferred to the destination clients in the multicast mode or broadcast mode, making the copying process of packets needless.

This enables the packet copying process load caused by the number of the destination client terminals and the bandwidth load of the ring network due to the copying process to be reduced.

[2] In order to achieve the above as mentioned object, a packet relay method (or device) according to one aspect of an embodiment comprises: a first step of (or portion) receiving a packet from a ring network; and a second step of (or portion) removing a common MPLS label from the received packet to be transmitted to destination clients when it is detected that the MPLS label common to the destination clients corresponding to a multicast address or all of the destination clients corresponding to a broadcast address is added to the received packet.

Namely, on the receiving side of the packet, as described above, it is possible to determine the received packet which has been transferred in multicast mode or broadcast mode, upon detecting the packet received from the ring network being added with the common MPLS label.

[3] In the above [2], the first step (or portion) may further include a third step of (or portion) transferring the received packet to the ring network.

[4] In the above [1], the second step (or portion) may further include a third step (or portion) of adding to the packet having the common MPLS label added, an RPR header in which a source address, a destination address, a unique address of a device executing the packet relay method for an allowable lifetime on the ring network of the transferred packet, the multicast address or broadcast address, and a predetermined allowable lifetime are set.

[5] In the above [3], the received packet may be further added with an RPR header in which a source address, a destination address, a unique address of a device executing the packet relay method for an allowable lifetime on the ring network of the transferred packet, the multicast address or broadcast address, and a predetermined allowable lifetime are set, and at the third step (or portion) the received packet may not be transferred to the ring network after the allowable lifetime within the RPR header reaches the predetermined allowable lifetime.

[6] In the above [3], the received packet may be further added with an RPR header in which a source address, a destination address, a unique address of a device executing the packet relay method for an allowable lifetime on the ring network of the transferred packet, the multicast address or broadcast address, and a predetermined allowable lifetime are set, and at the third step (or portion) the received packet may be discarded when a source address within the RPR header coincides with a unique address of a device executing the packet relay method exceeds the predetermined allowable lifetime.

[7] In the above [1], the first step (or portion) may comprise a step of (or portion) acquiring, from a table associating the multicast address or broadcast address with the MPLS label common to destination clients corresponding to the multicast address or all destination clients corresponding to the broadcast address.

Such a step (or portion) enables the common MPLS label to be easily managed with a table.

[8] In the above [1], the second step (or portion) may further include a step of (or portion) transferring a packet added with the common MPLS label to the ring network when flag information corresponding to the common MPLS label added at the first step (or portion) is detected as being valid from a table associating the flag information indicating whether or not transferring the packet added with the common MPLS label to the ring network is valid with the MPLS label common to destination clients corresponding to the multicast address or all destination clients corresponding to the broadcast address.

[9] In the above [2], the second step (or portion) may further include a step of (or portion) removing the common MPLS label from the packet to be transmitted to the destination client when flag information corresponding to the common MPLS label added to the received packet is detected as being valid from a table associating the flag information indicating whether or not receiving the packet added with the common MPLS label from the ring network is valid with the MPLS label common to destination clients corresponding to the multicast address or all destination clients corresponding to the broadcast address.

[10] In the above [1], the second step (or portion) may further include a step of (or portion) acquiring first flag information corresponding to the common MPLS label added at the first step (or portion) from a table associating the first flag information indicating from which direction of a device executing the packet relay method the packet added with the common MPLS label should be transferred to the ring network with the MPLS label common to destination clients corresponding to the multicast address or all destination clients corresponding to the broadcast address.

In this case, the packet transferring direction to the ring network can be set for each common MPLS label.

[11] In the above [1], the second step (or portion) may further include a third step of (or portion) determining a transferring direction of the packet added with the common MPLS label to the ring network, according to an arithmetic result obtained by performing hash function to at least one of the destination address and a unique address of the source client.

In this case, the packet transferring direction to the ring network can be dynamically set with hash function, whereby the bandwidth of the ring network can be fully utilized.

[12] In the above [10], the table may further include second flag information indicating whether or not a transferring direction of the packet added with the common MPLS label to the ring network should be determined according to a hash function performed to at least one of the destination address and a unique address of the source client; and the second step (or portion) may further include a third step of (or portion) acquiring the first and the second flag information corresponding to the common MPLS label added at the first step (or portion), determining the transferring direction according to an arithmetic result of the hash function when the second flag information indicates that the transferring direction should be determined by the hash function while otherwise determining the transferring direction according to the first flag information.

[13] In the above [11], the third step (or portion) may comprise using a function different per each common MPLS label as the hash function.

Namely, there is a possibility that the packet transferring direction to the ring network is unbalanced depending on a type of hash function, whereas such an unbalanced packet transferring direction can be prevented with a function different per each common MPLS label.

[14] In the above [4], the third step (or portion) may further include a step of (or portion) acquiring an allowable lifetime corresponding to the common MPLS label added at the first step (or portion), from a table associating the allowable lifetime with the MPLS label common to destination clients corresponding to the multicast address or all destination clients corresponding to the broadcast address.

In this case, such an allowable life time can be set for each common MPLS label, whereby the bandwidth of the ring network can be effectively utilized.

[15] In the above [14], the table may further include first flag information indicating whether or not the packet added with the common MPLS label should be transferred from which direction of a device executing the packet relay method to the ring network, and second flag information indicating whether or not the transferring direction should be determined according to a hash function performed to at least one of the destination address and the unique address of the source client; and the second step (or portion) may further include a fourth step of (or portion) acquiring from the table the first and the second flag information corresponding to the common MPLS label added at the first step (or portion), determining the transferring direction according to an arithmetic result of the hash function when the second flag information indicates that the transferring direction should be determined by the hash function while otherwise determining the transferring direction according to the first flag information.

[16] In the above [4], the third step (or portion) may comprise: a step of (or portion) acquiring flag information and allowable lifetime corresponding to the common MPLS label added at the first step (or portion), from a table associating the MPLS label common to destination clients corresponding to the multicast address or all destination clients corresponding to the broadcast address, flag information indicating whether or not the packet added with the common MPLS label should be transferred from both directions of a device executing the packet relay method, and an allowable lifetime for each direction; and a step of (or portion) copying the packet added with the common MPLS label when the acquired flag information indicates that the transferring should be transferred from both directions and of adding the copied packet with the RPR header having each allowable lifetime set for each packet to be transferred from both directions.

Namely, a packet is transferred from both directions of the packet relay device to the ring network in multicast mode or broadcast mode, where the allowable life time is set for each direction in order that there exists no destination client receiving the same packet redundantly from the ring network. This enables each destination client to receive a packet relayed via the direct route on the ring network.

[17] In the above [7], the packet relay method (or device) may further comprise a step of (or portion) updating or reading the table setting based on instructions from an external device.

Namely, as in the above [17], setting the table can be managed from e.g. a maintenance terminal, thereby enabling a maintenance person to easily perform normality checking operation of the table or maintenance operation at a change of the configuration of a ring network.

[18] In the above [1], the packet relay method (or device) may further comprise a step of (or portion) sending statistic information of a packet transferred to the ring network to an external device.

[19] In the above [2], the packet relay method (or device) may further comprise a step of (or portion) sending statistic information of a packet received from the ring network to an external device.

Namely, in the above [18] or [19], it is possible to monitor statistic information such as the number or the data quantity of the packet transferred on the ring network from the maintenance terminal, whereby the maintenance person can promptly perform analysis operations for cases where packet losses arise on the ring network.

Thus, it becomes possible to effectively perform packet transfer in multicast mode or broadcast mode, thereby improving transferring efficiency of a ring network applied. Also, packet defects or losses can be prevented from being generated, thereby improving ring network reliability.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 2 shows an example of a MAC address table used in an embodiment of a packet relay method and device;

FIG. 6 shows a modification of a MAC address table used in an embodiment of a packet relay method and device;

FIG. 7 shows an example of a RPR multicast/broadcast table used in an embodiment of a packet relay method and device;

FIG. 8 shows an example of a RPR table used in an embodiment of a packet relay method and device;

FIG. 9 shows a modification (1) of an RPR table used in an embodiment of a packet relay method and device;

FIG. 10 shows a modification (2) of an RPR table used in an embodiment of a packet relay method and device;

FIG. 11 shows a modification (3) of an RPR table used in an embodiment of a packet relay method and device;

FIG. 12 shows a modification (4) of an RPR table used in an embodiment of a packet relay method and device;

FIG. 13 shows a modification (5) of an RPR table used in an embodiment of a packet relay method and device;

FIG. 14 shows a modification (6) of an RPR table used in an embodiment of a packet relay method and device;

FIG. 18 shows an example of a MAC address table used in the prior art RPR node;

FIG. 20 shows an example of an RPR unicast table used in an embodiment of a packet relay method and device as well as the prior art RPR node.

DESCRIPTION OF THE EMBODIMENTS

Figure 1:
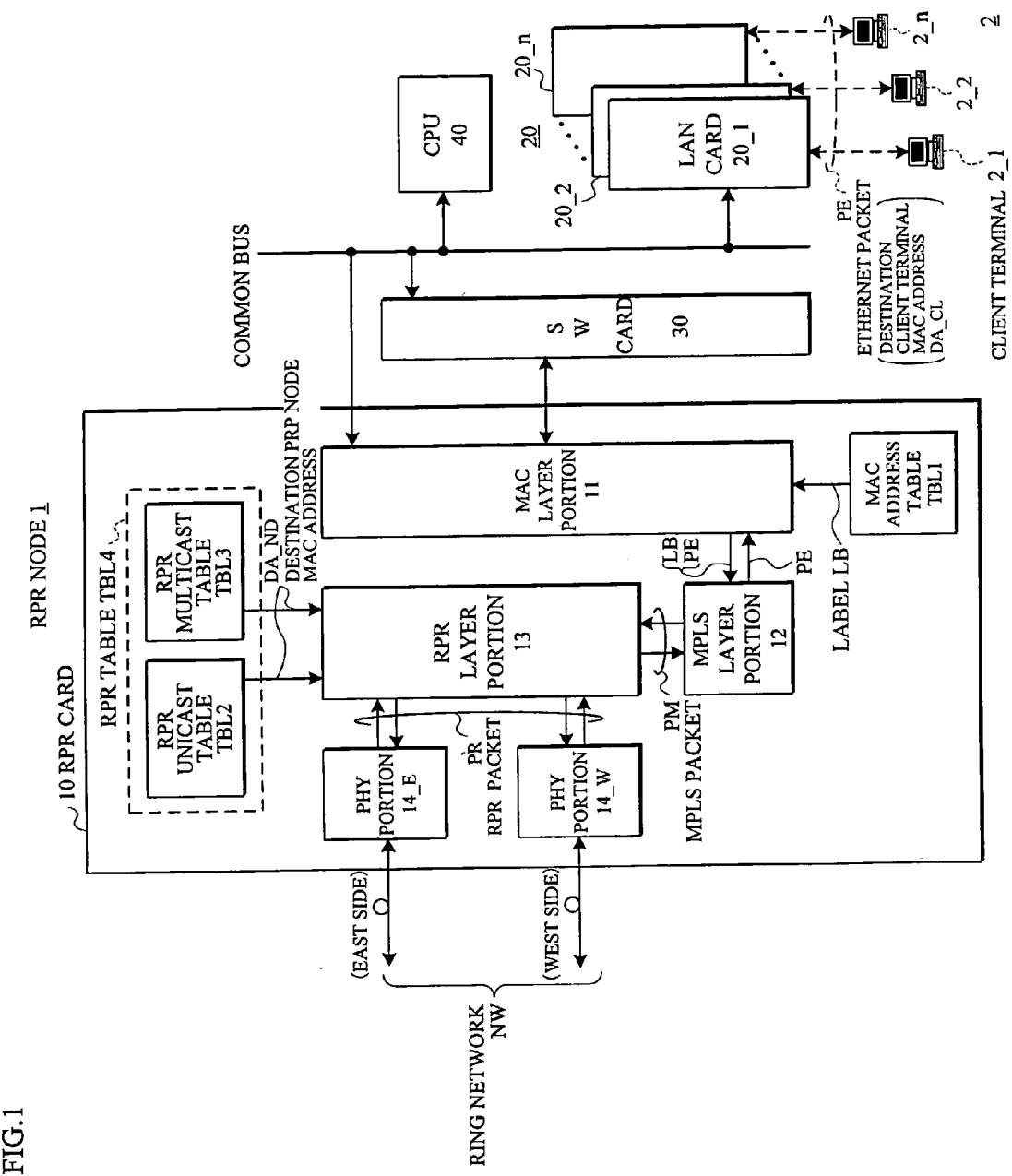
FIG. 1 is a block diagram showing a composition of an embodiment of a packet relay method and device.

Hereinafter, an embodiment of a packet relay method and device in which an RPR node is employed as the device will be described referring to FIGS. 1-14.
Composition: FIGS. 1 and 2

Figure 16:
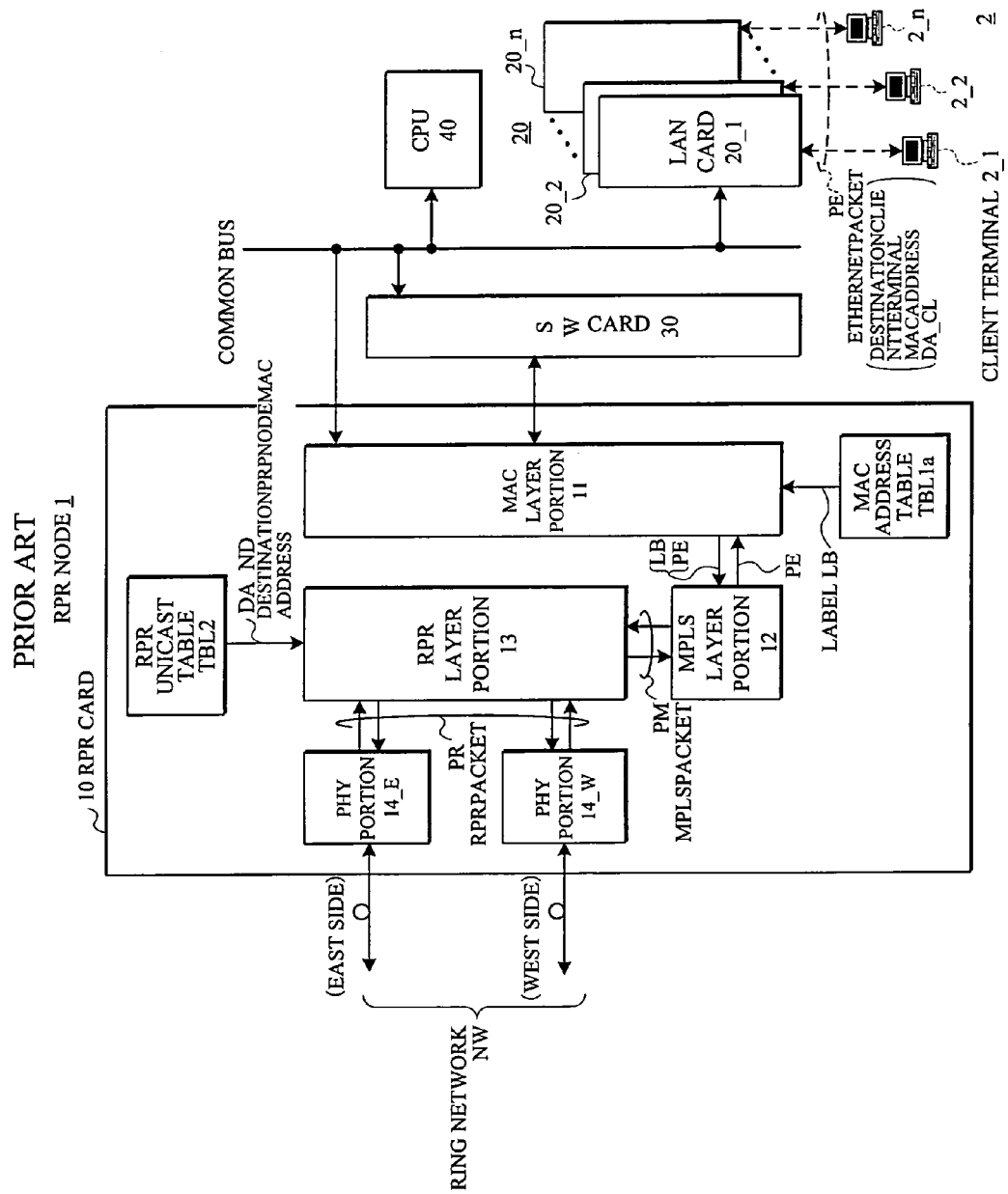
FIG. 16 is a block diagram showing a composition of the prior art RPR node.

An RPR node 1 of an embodiment shown in FIG. 1 comprises, in addition to the prior art composition shown in FIG. 16, an RPR multicast table TBL3 referred to by the RPR layer portion 13.

In a MAC address table TBL1 of this embodiment, different from the prior art table TBL1a shown in FIG. 18, a common MPLS label (hereinafter, referred to as a common label) LB_C="100" corresponding to a multicast address "80-00-00-00-77-77" as shown by dotted lines in FIG. 2.

It is to be noted that this embodiment employs the prior art RPR unicast table TBL2 shown in FIG. 20 as it is.

A packet relay operation of this RPR node 1 will now be described referring to FIGS. 3-14.

Packet relay operation: FIGS. 3-14

For a relay operation of an Ethernet packet PE received from the client terminal 2, [1] an RPR packet transmission operation of the RPR node 1 will be described referring to FIGS. 3 and 4, and [2] an RPR packet receiving operation of the RPR node 1 will be described referring to FIGS. 4 and 5.

Figure 3:
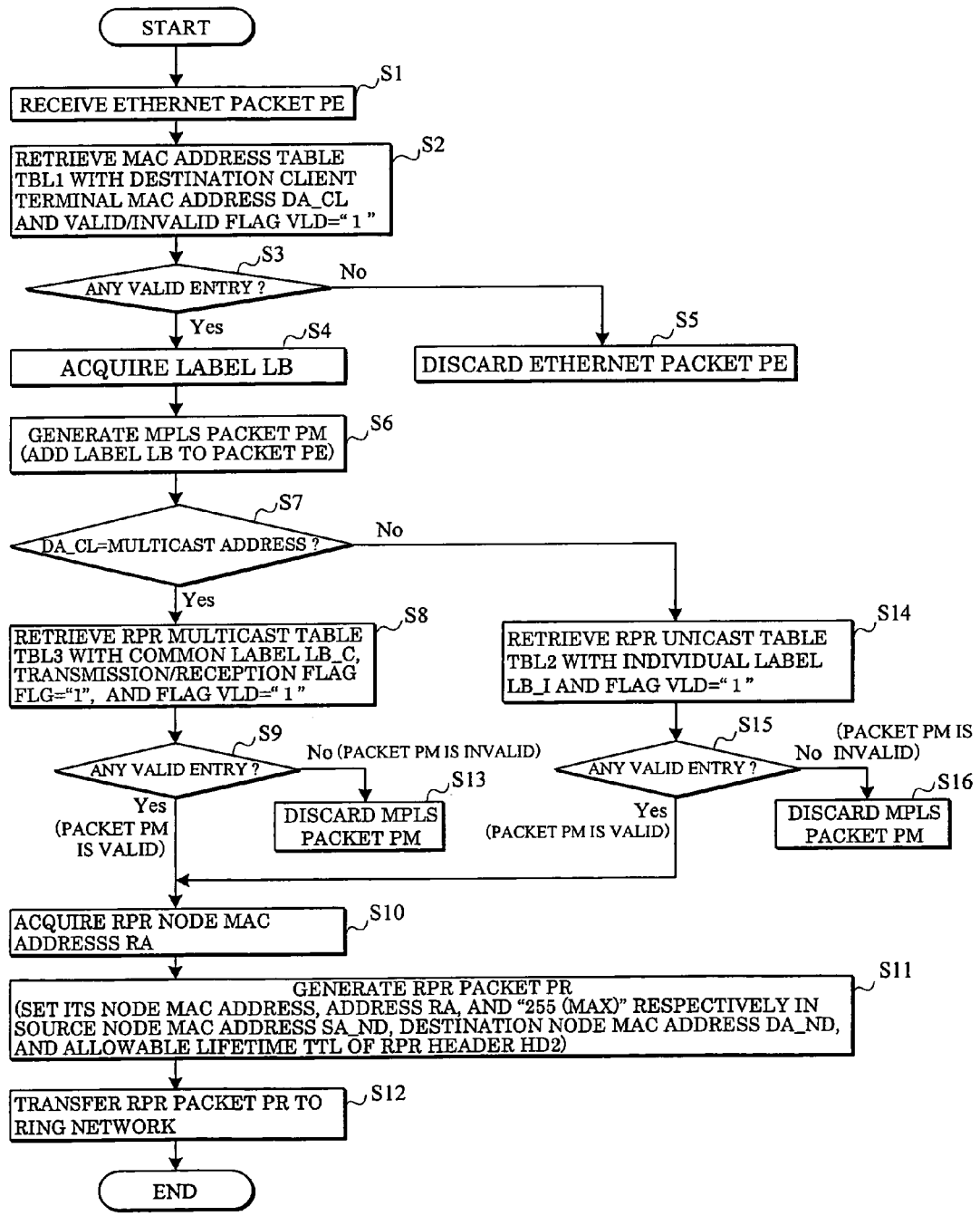
FIG. 3 is a flow chart showing an RPR packet transmission example in an embodiment of a packet relay method and device.

FIG. 6 shows a modification of the MAC address table TBL1 shown in FIG. 3; FIG. 7 shows a format example of an RPR multicast/broadcast table TBL3a in which broadcast addresses are added to the RPR multicast table TBL3 shown in FIG. 4; FIG. 8 shows a format example of a table (hereinafter, referred to as RPR table) TBL4 integrating the RPR unicast table TBL2 and the RPR multicast table TBL3 as shown by dotted lines in FIG. 1. Also, modifications (1)-(6) of the RPR table TBL4 are shown in FIGS. 9-14, respectively.

[1] RPR packet transmission operation: FIGS. 3 and 4

As shown in FIG. 3, the MAC layer portion 11 forming the RPR card 10 receives an Ethernet packet PE from the client terminal 2 through the LAN card 20 (step S1).

At this time, the MAC layer portion 11 retrieves the MAC address table TBL1 shown in FIG. 2 by using a destination client terminal MAC address DA_CL in the Ethernet packet PE (step S2).

Figure 15:
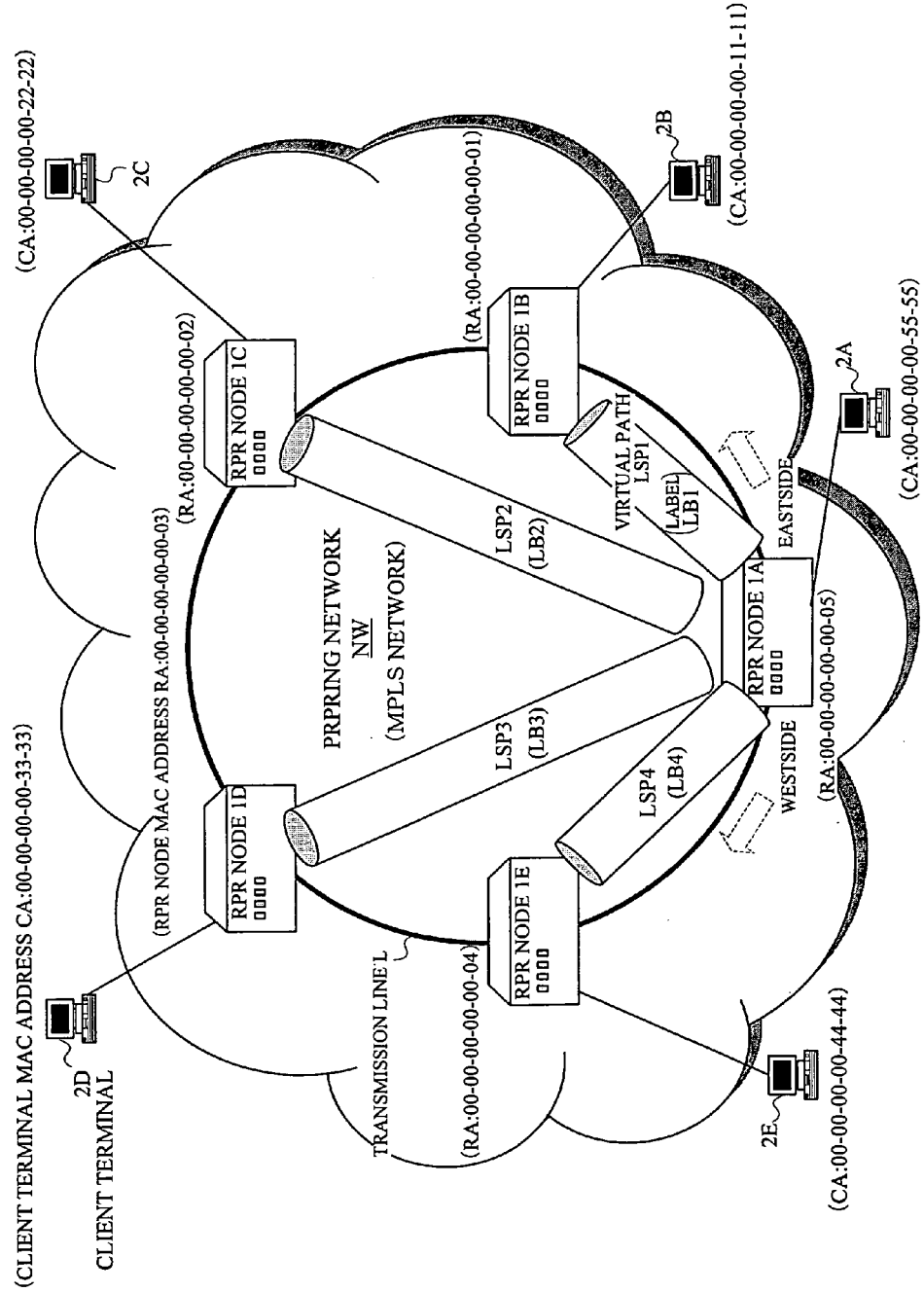
FIG. 15 is a block diagram showing a general configuration of an RPR ring network.

Namely, taking a case where the Ethernet packet PE received from the client terminal 2A shown in FIG. 15 is transferred to the client terminals 2B-2D in multicast mode like the above-described prior art multicast transferring operation for instance, when it is established that the destination client terminal MAC address DA_CL="80-00-00-00-77-77" and the valid/invalid flag VLD="1 (valid)", the MAC layer portion 11 within the RPR node 1A determines that a common label LB_C corresponding to the address DA_CL="80-00-00-00-77-77" in the MAC address table TBL1 is a valid entry (step S3), acquiring a label value "100" of the common label LB_C from the table TBL1 (step S4).

It is to be noted that the MAC layer portion 11 does not discriminate the common label LB_C from the label values "1"-"4" of labels (hereinafter, referred to as individual label) LB_I respectively corresponding to the MAC address "00-00-00-00-11-11", "00-00-00-00-22-22", "00-00-00-00-33-33", and "00-00-00-00-44-44" of the client terminals 2B-2E, and treats them as a label LB mutually different in label value.

On the other hand, at the above step S3, when a valid entry corresponding to the destination client terminal MAC address DA_CL="80-00-00-00-77-77" can not be detected from the MAC address TBL1, the MAC layer portion 11 finds that the Ethernet packet PE is invalid and discards it (step S5).

The MAC layer portion 11 provides the Ethernet packet PE and the label LB obtained at the above step S4 to the MPLS layer portion 12.

Figure 17:
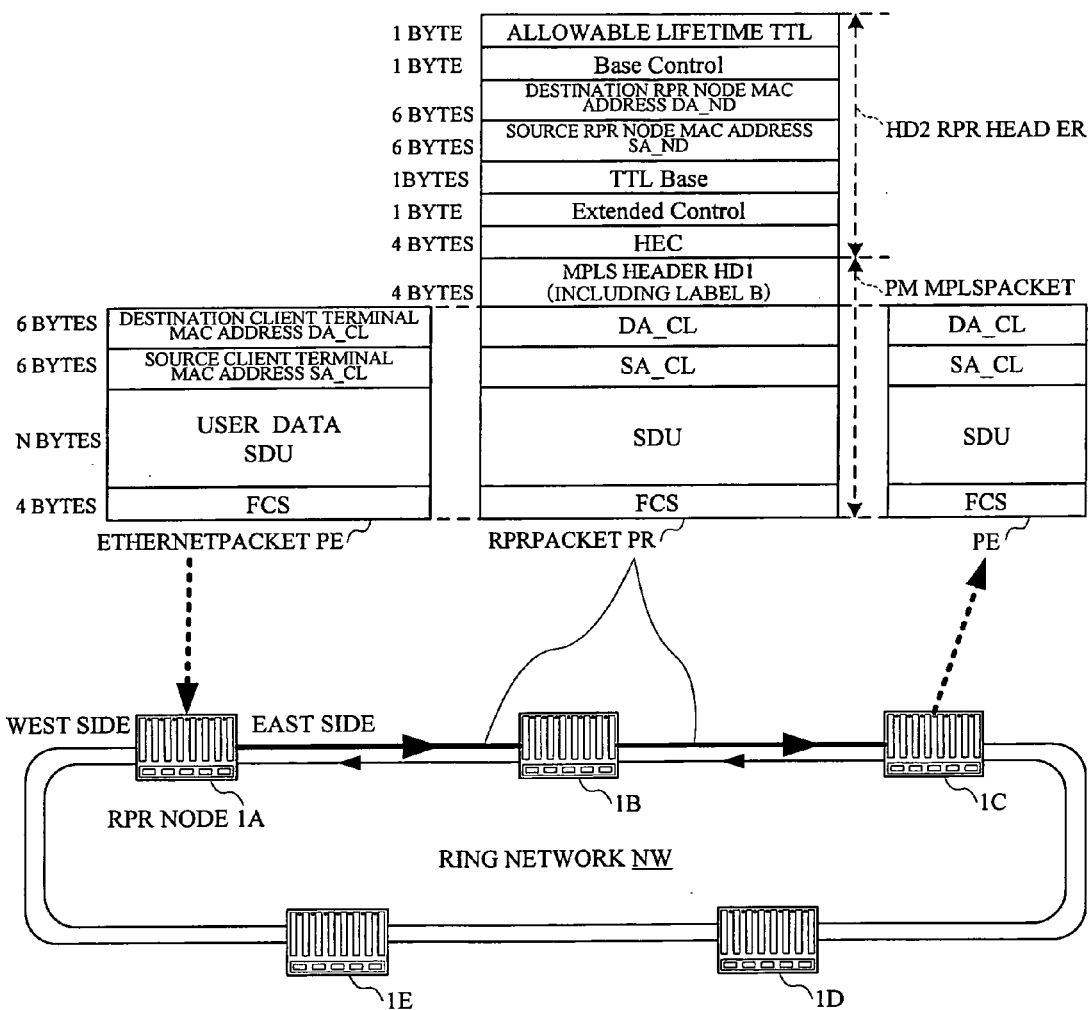
FIG. 17 is a block diagram showing a unicast transfer operation of an RPR packet in the prior art RPR node.
Figure 19:
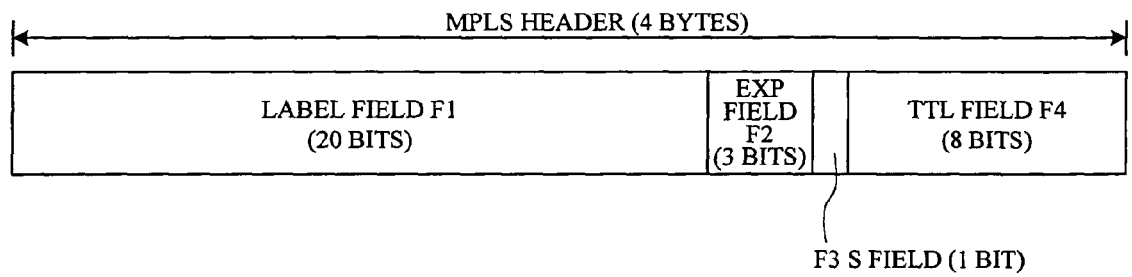
FIG. 19 is a block diagram showing a general format example of MPLS header.

In response, the MPLS layer portion 12 generates an MPLS packet PM in which an MPLS header HD1 set with the label LB (common label LB_C="100" acquired at the above step S4) in the same manner as FIG. 17 is added to the Ethernet packet PE, and provides it to the RPR layer portion 13 (step S6).

The RPR layer portion 13 checks if the destination client terminal MAC address DA_CL in the MPLS header HD1 is a multicast address (step S7). Since the multicast address "80-00-00-00-77-77" is now set in the address DA_CL, the RPR layer portion 13 retrieves the RPR multicast table TBL3 with the common label LB_C="100" (step S8).

Figure 4:
FIG. 4 shows an example of a RPR multicast table used in an embodiment of a packet relay method and device.

It is to be noted that in the RPR multicast table TBL3, as shown in FIG. 4, the common label LB_C is stored in association with multicast address, a transmission/reception flag FLG indicating which of transmission or reception of the MPLS packet PM added with the common label LB_C should be valid, that is whether the MPLS packet PM should be transmitted or received, with respect to the ring network NW, and valid/invalid flag VLD.

Namely, when an entry coinciding with the common label LB_C="100" is retrieved from the RPR multicast table TBL3, the transmission/reception flag FLG corresponding to the common label LB_C="100" indicates "11" (transmission), and the valid/invalid flag VLD indicates "1 (valid)", the RPR layer portion 13 determines that the MPLS packet PM is a valid packet to be transferred to the ring network NW (step S9).

At this time, the RPR layer portion 13 acquires the RPR node MAC address RA corresponding to the common label LB_C="100" as the destination RPR node MAC address DA_ND from the RPR multicast table TBL3 (step S10).

It is to be noted that in the RPR multicast table TBL3, as the RPR node MAC address RA corresponding to the common label LB_C="100", the same multicast address as the destination client terminal MAC address DA_CL "80-00-00-00-77-77" is stored, where the RPR node MAC address RA in the table TBL3 is not necessarily the same multicast address as the destination client terminal MAC address DA_CL but may be an address distinguishable between the RPR nodes as to whether or not the RPR packet PR transferred over the ring network NW has been transferred in multicast mode.

Then, the RPR layer portion 13 generates the RPR packet PR in which the MPLS packet PM is added with the RPR header HD2 set in the same manner as FIG. 16 (step S11), and transfers it to the ring network NW from East side or West side (predetermined direction by a maintenance person etc.) of its own node through either the PHY portion 14_E or 14_W (step S12).

Meanwhile, at the above step S9, when having determined that the MPLS packet PM is an invalid packet which should not be transferred to the ring network NW, the RPR layer portion 13 discards the MPLS packet PM (step S13).

At the above step S7, when having determined that the destination client terminal MAC address DA_CL is not a multicast address (namely, having determined that the address DA_CL is a unicast address), the RPR layer portion 13 retrieves the RPR unicast table TBL2 with the individual label LD_I (step S14).

For example, assuming that the MAC address="00-00-00-00-22-22" of the client terminal 2C is set at the destination client terminal MAC address DA_CL, and at the above step S4 the label value="2" is acquired as the individual label LB_I from the MAC address table TBL1 shown in FIG. 2, the valid/invalid flag VLD corresponding to the label value="2" in the RPR unicast table TBL2 shown in FIG. 20 is "1 (valid)", so that the RPR layer portion 13 determines that the MPLS packet PM is a valid packet (step S15) and acquires, at the above step S10, the RPR node MAC address RA="00-00-00-00-00-02" corresponding to the label value="2" as the destination RPR node MAC address DA_ND from the table TBL2.

Then, the RPR layer portion 13 generates, at the above step S11, an RPR packet PR in which the MPLS packet PM is added with the RPR header HD2, and transfers, at the above step S12, the RPR packet PR to the ring network NW.

On the other hand, when having determined at the above step S15 that the MPLS packet PM is an invalid packet, the RPR layer portion 13 discards the MPLS packet PM as with the above step S13 (step S16).

[2] RPR packet receiving operation: FIGS. 4 and 5

Figure 5:
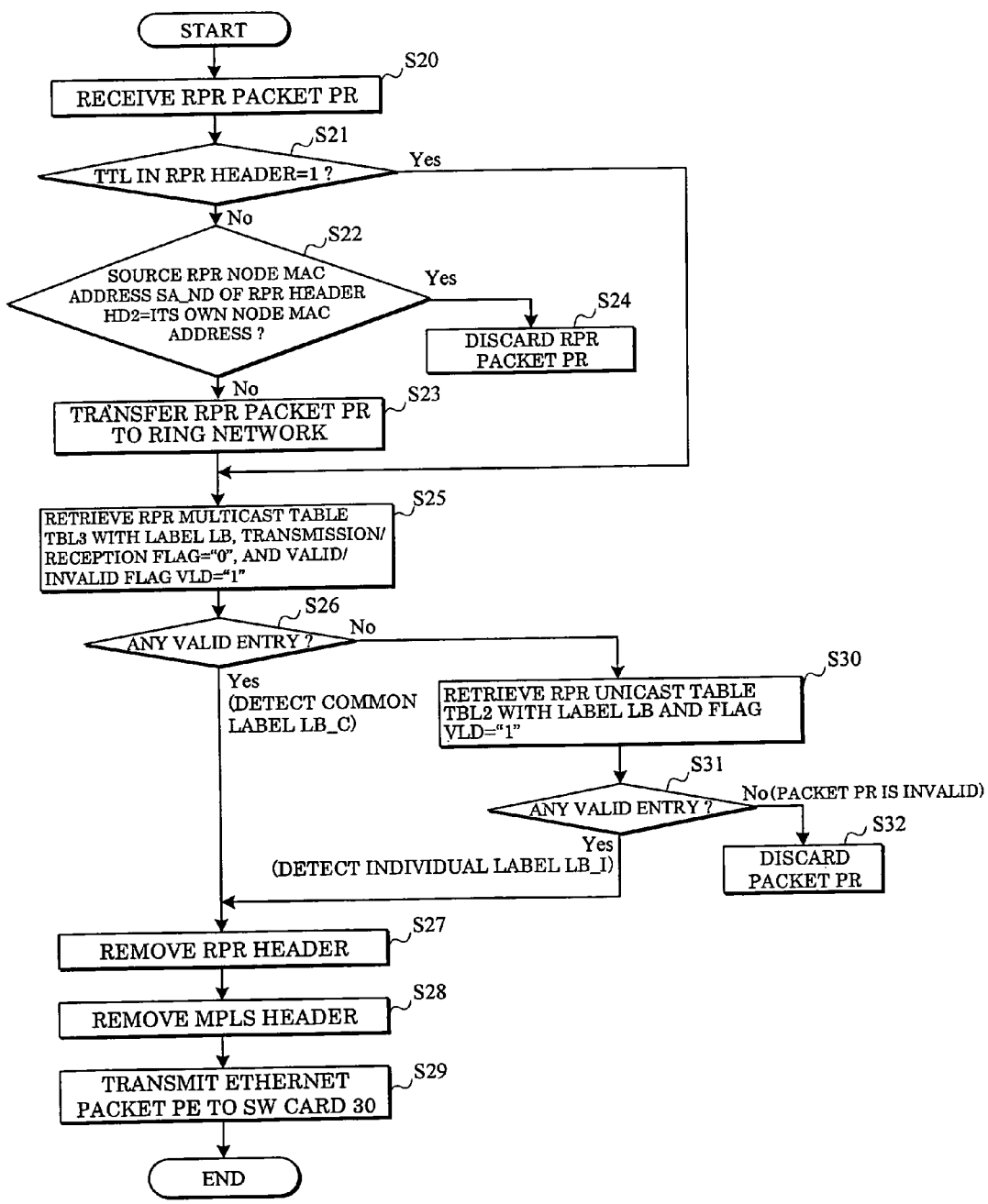
FIG. 5 is a flow chart showing an RPR packet reception example in an embodiment of a packet relay method and device.

As shown in FIG. 5, the PHY portion 14 shown in FIG. 1 receives the RPR packet PR transferred over the ring network NW upon the above RPR packet transmission operation, and provides it to the RPR layer portion 13 (step S20).

When referring to the allowable life time TTL in the RPR header HD2 of the RPR packet PR (step S21) and finding that it is not "1" (namely, the life time of the RPR packet PR on the ring network NW has not yet reached the allowable time period), the RPR layer portion 13 checks if the source RPR node MAC address SA_ND coincides with its own node MAC address (step S22).

When having determined that the address SA_ND does not coincide with its own node MAC address, the RPR layer portion 13 transfers the received RPR packet PR to the ring network NW (step S23). At this time, the RPR layer portion 13 transfers the RPR packet PR to the ring network NW from the opposite side thereof to the receiving side, at which time the RPR layer portion 13 decrements the allowable life time TTL in the RPR header HD2 by "1".

On the other hand, when having recognized at the above step S21 that the allowable life time TTL is "1", the RPR layer portion 13 determines that no transfer is needed to the ring network NW of the received RPR packet PR and proceeds to the following step S25 without transmitting it to the ring network NW.

When having determined at the above step S22 that the source RPR node MAC address SA_ND coincides with its own node MAC address, the RPR layer portion 13 finds that the RPR packet PR transmitted from its node goes around the ring network NW and has returned, thereby discarding the RPR packet PR (step S24).

Except for routing the above step S24, the RPR layer portion 13 retrieves the RPR multicast table TBL3 by using the label LB in the MPLS header HD1 included in the RPR packet PR (step S25), at which the RPR layer portion 13 retrieves the RPR multicast table TBL3 shown in FIG. 4 with the label value of the label LB, the transmission/reception flag FLD="0" (reception), and the valid/invalid flag VLD="1".

Now assuming that the common label LB_C="100" is set as the label value of the label LB, a valid entry corresponding to the common label LB_C="100" is retrieved from the RPR multicast table TBL3. Therefore, the RPR layer portion 13 detects that a valid common label LB_C is set in the MPLS header HD1 included in the RPR packet PR (step S26) and provides to the MPLS layer portion 12 an MPLS packet PM obtained by removing the RPR header HD2 from the RPR packet PR (step S27).

The MPLS layer portion 12 provides the Ethernet packet PE obtained by removing the MPLS header HD1 from the MPLS packet PM to the MAC layer portion 11 (step S28).

In response, the MAC layer portion 11 transmits the Ethernet packet PE to the client terminal 2 through the SW card 30 and LAN card 20 (step S29). Namely, assuming that the above steps S20-S29 are respectively executed in the RPR nodes 1B-1D shown in FIG. 15, in the above RPR packet transmission operation the Ethernet packet PE transmitted from the client terminal 2A is to be transferred to the client terminals 2B-2D in multicast mode.

On the other hand, when having not been able to detect at the above step S26 that a valid common label LB_C is set in the MPLS header HD1 (namely, the label LB in the MPLS header HD1 may be the individual label LB_I), the RPR layer portion 13 retrieves the RPR unicast table TBL2 shown in FIG. 20 with the label LB as well as the valid/invalid flag VLD="1" (step S30).

Accordingly, when a valid entry is retrieved from the table TBL2, the RPR layer portion 13 detects that the label LB is a valid individual label LB_I (step S31) and executes the above steps S27-S29 whereby the Ethernet packet PE is transmitted to the client terminal 2.

On the other hand, when having not been able to detect a valid individual label LB_1 at the above step S31, the RPR layer portion 13 determines that the RPR packet PR is an invalid packet to be discarded (step S32).

Thus, it becomes unnecessary to perform copying processes of the Ethernet packet PE because between the RPR nodes 1 a single RPR packet PR may be transferred to the ring network NW even in either case of multicast transfer or unicast transfer of the Ethernet packet PE.

Modification of MAC address table and composition example of RPR multicast/broadcast table: FIGS. 6 and 7

In the MAC address table TBL1, as shown by dotted lines in FIG. 6, it is also possible to store a broadcast address "FF-FF-FF-FF-FF-FF" ("1" is set to all bits) in association with the common label LB_C="400". Correspondingly, the RPR node 1 uses the RPR multicast/broadcast table TBL3a shown in FIG. 7, not the RPR multicast table TBL3 shown in FIG. 4. This table TBL3a includes records of the common label LB_C="400" shown by dotted lines in FIG. 7 and its corresponding broadcast address "FF-FF-FF-FF-FF-FF", in addition to the RPR multicast table TBL3 shown in FIG. 4.

Namely, the RPR layer portion 13 within the RPR node 1 having received the Ethernet packet PE from the client terminal 2 executes steps S8-S12 after step S7 shown in FIG. 3 also when the destination client terminal MAC address DA_CL is a broadcast address, thereby transferring a single RPR packet PR to the ring network NW, while the RPR layer portion 13 within each RPR node having received the RPR packet PR from the ring network NW executes steps S27-S29 after step S26 shown in FIG. 5 also when it detects the common label LB_C="400" corresponding to the broadcast address "FF-FF-FF-FF-FF-FF" from the RPR multicast/broadcast table TBL3a, thereby transmitting the Ethernet packet PE to each client terminal.

It is to be noted that the broadcast address "FF-FF-FF-FF-FF-FF" is a special address used in all client terminals, in which all of the RPR nodes 1 over the ring network NW can be a transmission node or a receiving node of the RPR packet PR, so that the RPR node 1 does not include the transmission/reception flag FLG corresponding to the common label LB_C="400" in the RPR multicast/broadcast table TBL3a as a retrieval condition or determination condition.

Composition example of RPR table: FIG. 8

The RPR node 1 can use an RPR table TBL4 shown in FIG. 8 upon the transmitting operation and receiving operation of the RPR packet PR. This table TBL4 is, as shown in FIG. 8, an integration of the RPR unicast table TBL2 shown in FIG. 20 and the RPR multicast table TBL3 shown in FIG. 4.

In this case, the RPR node 1 determines whether the label LB is either the common label LB_C or individual label LB_I from the label values of the label LB in the MPLS header HD1 included in the RPR packet PR. In this example, the RPR node 1 detects the label LB as being the common label LB_C when the label value is equal to or more than "100" while detecting the label LB as being the individual label LB_I when the label value is below "100", thereby performing a similar operation to the above noted RPR packet transmitting operation and receiving operation.

Hereinafter, modifications (1)-(6) of the above RPR table TBL4 and transmitting/receiving operations of the RPR packet using those modifications will be described referring to FIGS. 9-14.

Modification (1) of RPR table: FIG. 9

The RPR table TBL4 shown in FIG. 9 has, as shown by dotted lines, an East side transfer flag TRE and an West side transfer flag TRW provided per the label LB in addition to the RPR table TBL4 shown in FIG. 8, where the East side transfer flag TRE and the West side transfer flag TRW have exclusively set therein "1" (transfer) and "0" (non-transfer), indicating from which direction of the East side or the West side of the RPR node 1 the RPR packet PR should be transferred to the ring network NW.

Namely, the records of the label value="100" and the transmission/reception flag FLG="1 (transmission)" in the RPR table TBL4 are set with "1 (transfer)" and "0 (non-transfer)" as the East side transfer flag TRE and the West side transfer flag TRW respectively, so that the RPR node 1 having received the Ethernet packet PE from the client terminal 2 transfers the RPR packet PR from the East side thereof to the ring network NW, at step S12 shown in FIG. 3.

Also, the records of the label value="100" and the transmission/reception flag FLG="0 (transmission)" in the RPR table TBL4 are set with "1 (transfer)" and "0 (non-transfer)" as the East side transfer flag TRE and the West side transfer flag TRW respectively, so that the RPR node 1 having received the RPR packet PR from the ring network NW transfers the RPR packet PR to the ring network NW from its East side (namely, the same direction as the transfer direction of the RPR node 1 having transmitted the RPR packet PR to the ring network NW), at step S23 shown in FIG. 5.

Thus, it becomes possible to set the transfer direction of the RPR packet PR to the ring network NW for each label LB.

Modification (2) of RPR table: FIG. 10

The RPR table TBL4 shown in FIG. 10, as shown by dotted lines, has a hash function flag HSH provided per label LB in addition to the modification (1) of the above RPR table, where the hash function flag HSH indicates whether or not the transfer direction of the RPR packet PR to the ring network NW should be determined by hash function, so that "1 (valid)" is set only when the East side transfer flag TRE and the West side transfer flag TRW are set with "0 (non-transfer)" (namely, when controls with the flags TRE and TRW are invalidated).

Namely, the records of the label value="100" and the transmission/reception flag FLG="1 (transmission)" in the RPR table TBL4 are set with "1 (valid)" as the hash function flag HSH, so that the RPR node 1 having received the Ethernet packet PE from the client terminal 2 transfers, at step S13 shown in FIG. 3, the RPR packet PR to the ring network NW in accordance with an arithmetic result obtained by performing the hash function to the destination client terminal address DA_CL and the source client terminal address SA_CL in e.g. the Ethernet packet PE.

It is to be noted that the algorithm of the above hash function uses a binary value of "0" or "1" for example as a result of the operation of hash function, in which the RPR node 1 transfers the RPR packet PR to the ring network NW from its East side when the arithmetic result is "0", or from its West side when the arithmetic result is "1".

Also, the records of the label value="100" and the transmission/reception flag FLG="0 (reception)" in the RPR table TBL4 are set with "0 (non-transfer)", "0 (non-transfer)", and "0 (invalid)" respectively as the East side transfer flag TRE, West side transfer flag TRW, and hash function flag HSH, so that the RPR node 1 having received the RPR packet PR from the ring network NW transfers, at step S23 shown in FIG. 5, the RPR packet PR to the ring network NW from the opposite side to the receiving side irrespectively of the settings of those flags TRE, TRW, and HSH.

Thus, it becomes possible to dynamically set the transfer direction of the RPR packet PR to the ring network NW by hash function, thereby fully utilizing the bandwidth of the ring network NW.

Modification (3) of RPR table: FIG. 11

The RPR table TBL4 shown in FIG. 11 has, as shown by dotted lines, hash function flag HSH set with "0 (non-transfer)", "1 (valid)", and "2 (valid)", different from the modification (2) of the above RPR table, in order to prevent unbalanced transfer direction which may arise due to a single algorithm of the hash function being performed.

Namely, the RPR node 1 uses an algorithm or function EXP1 when the label value of the label LB is "200" (namely, when hash function flag HSH="1"), and uses an algorithm EXP2 different from the algorithm EXP1 when the label value of the label LB is "300" (namely, when a hash function flag HSH="2"), whereby hash function is performed to the destination client terminal address DA_CL and the source client terminal address SA_CL in the Ethernet packet PE.

Thus, it becomes possible to improve unbalanced transfer direction of the RPR packet PR to the ring network NW with an algorithm different per label LB in comparison with the modification (2) of the above RPR table.

Modification (4) of RPR table: FIG. 12

The RPR table TBL4 shown in FIG. 12 has, as shown by dotted lines, a TTL setting (East side) SET_E and a TTL setting (West side) SET_W provided per label LB in addition to the modification (1) of the above RPR table, where the TTL settings SET_E and SET_W indicate values to be set as an allowable life time TTL in the RPR header HD2 upon transferring the RPR packet PR to the ring network NW.

Namely, the records of label value="100" and the transmission/reception flag FLG="1 (transmission)" in the RPR table TBL4 are set with "1 (transfer)" and "3" respectively as the East side transfer flag TRE and the TTL setting SET_E, so that e.g. an RPR node 1A shown in FIG. 15 sets, at step S11 shown in FIG. 3, the allowable life time TTL in the RPR header HD2 with "3", and transfers the RPR packet PR from its East side to the ring network NW at step S12.

This makes the RPR packet PR transfer only to the RPR nodes 1B-1D requiring the transfer, but not to the RPR node 1E not requiring the transfer, thereby enabling the bandwidth of the ring network NW to be effectively utilized.

Modification (5) of RPR: FIG. 13

The RPR table TBL4 shown in FIG. 13 has the hash function flag HSH described in the modification (2) of the above RPR table TBL in addition to the composition of the modification (4) of the RPR table.

Namely, the RPR node 1 performs a transfer operation in accordance with the arithmetic result of hash function in the same manner as the modification (2) of the above RPR table TBL when the hash function flag HSH is set to "1 (valid)", while it performs setting operations of the allowable life time TTL in accordance with the settings of the TTL setting SET_E and SET_W in the same manner as the modification (4) of the above RPR table and performs transfer operations in accordance with the settings of the transfer flags TRE and TRW when the hash function flag HSH is set to "0 (valid)".

Modification (6) of RPR table: FIG. 14

The RPR table TBL4 shown in FIG. 14 has, as shown by dotted lines, the East side transfer flag TRE and the West side transfer flag TRW commonly set with the "1 (transfer)" and TTL setting (East side) SET_E and the TTL setting (West side) SET_W respectively set with "2", different from the modification (4) of the above RPR table.

Namely, the RPR node 1A shown in FIG. 15 for example provides, at step S11 shown in FIG. 3, 2 MPLS packets by copying the MPLS packet PM, and generates 2 RPR packets PR in which each MPLS packet PM is added with the RPR header HD2 set with "2" respectively as the allowable life time TTL. Then, the RPR node 1A transfers, at step S12 shown in FIG. 3, each RPR packet PR to the ring network NW respectively from its East side and West side.

Accordingly, the RPR packet PR transmitted to the ring network NW from the East side of the RPR node 1A is transferred only to the RPR nodes 1B and 1C, and the RPR packet PR transmitted from the West side of the RPR node 1A is transferred only to the RPR nodes 1D and 1E, so that the client terminals 2B-2E respectively connected to the RPR nodes 1B-1E can receive the Ethernet packet PE relayed through the direct route on the ring network NW.

Also, a CPU40 within the RPR node 1 shown in FIG. 1 reads the contents of the MAC address table TBL1 shown in FIGS. 2 and 6, the RPR unicast table TBL2 shown in FIG. 20, the RPR multicast table TBL3 shown in FIG. 4, the RPR multicast/broadcast table TBL3a shown in FIG. 7, and the RPR table TBL4 shown in FIGS. 8-14, to be transmitted to a maintenance terminal (not shown) through the LAN card 20. Reversely, the CPU40 can also update the contents of the tables TBL1-TBL4 based on instructions from the maintenance terminal.

Also, the CPU40 collects statistic information such as the number and data quantity of the RPR packet PR transmitted/received over the ring network NW, to be transmitted to the maintenance terminal through the LAN card 20.

It is to be noted that the present invention is not limited by the above-mentioned embodiments, and it is obvious that various modifications may be made by one skilled in the art based on the recitation of the claims.

What is claimed is:

1. A packet relay method comprising:
    adding to a packet, when the packet having a multicast address or broadcast address set therein as a destination address is received from a source client, a common MPLS label which is an MPLS label common to destination clients corresponding to the multicast address or all destination clients corresponding to the broadcast address; and
    transferring the packet added with the common MPLS label over a ring network, wherein:
        the transferring further includes adding to the packet having the common MPLS label added, a Resilient Packet Ring (RPR) header in which a source address, a destination address, a unique address of a device executing the packet relay method for an allowable lifetime on the ring network of the transferred packet, the multicast address or broadcast address, and a predetermined allowable lifetime are set;
        the adding further includes acquiring an allowable lifetime corresponding to the common MPLS label added, from a table associating the allowable lifetime with the MPLS label common to destination clients corresponding to the multicast address or all destination clients corresponding to the broadcast address; and
        the table further includes first flag information indicating whether or not the packet added with the common MPLS label should be transferred from which direction of a device executing the packet relay method to the ring network, and second flag information indicating whether or not the transferring direction should be determined according to a hash function performed to at least one of the destination address and the unique address of the source client; and
        the transferring of the packet further includes acquiring from the table the first and the second flag information corresponding to the common MPLS label added, determining the transferring direction according to an arithmetic result of the hash function when the second flag information indicates that the transferring direction should be determined by the hash function while otherwise determining the transferring direction according to the first flag information.

2. The packet relay method as claimed in claim 1, comprising:
receiving the packet from the ring network; and
removing the common MPLS label from the received packet to be transmitted to the destination clients when it is detected that the MPLS label common to the destination clients corresponding to the multicast address or all of the destination clients corresponding to the broadcast address is added to the received packet.

3. The packet relay method as claimed in claim 2, wherein the receiving of the packet includes transferring the received packet to the ring network.

4. The packet relay method as claimed in claim 3, wherein the received packet is further added with an RPR header in which a source address, a destination address, a unique address of a device executing the packet relay method for an allowable lifetime on the ring network of the transferred packet, the multicast address or broadcast address, and a predetermined allowable lifetime are set, and at the transferring the received packet is not transferred to the ring network after the allowable lifetime within the RPR header reaches the predetermined allowable lifetime.

5. The packet relay method as claimed in claim 3, wherein the received packet is further added with an RPR header in which a source address, a destination address, a unique address of a device executing the packet relay method for an allowable lifetime on the ring network of the transferred packet, the multicast address or broadcast address, and a predetermined allowable lifetime are set, and at the transferring the received packet is discarded when a source address within the RPR header coincides with a unique address of a device executing the packet relay method exceeds the predetermined allowable lifetime.

6. The packet relay method as claimed in claim 1, wherein the adding of the packet comprises acquiring, from a table associating the multicast address or broadcast address with the MPLS label common to destination clients corresponding to the multicast address or all destination clients corresponding to the broadcast address.

7. The packet relay method as claimed in claim 1, wherein the transferring of the packet includes transferring a packet added with the common MPLS label to the ring network when flag information corresponding to the common MPLS label added is detected as being valid from a table associating the flag information indicating whether or not transferring the packet added with the common MPLS label to the ring network is valid with the MPLS label common to destination clients corresponding to the multicast address or all destination clients corresponding to the broadcast address.

8. The packet relay method as claimed in claim 2, wherein the removing of the common MPLS label includes removing the common MPLS label from the packet to be transmitted to the destination client when flag information corresponding to the common MPLS label added to the received packet is detected as being valid from a table associating the flag information indicating whether or not receiving the packet added with the common MPLS label from the ring network is valid with the MPLS label common to destination clients corresponding to the multicast address or all destination clients corresponding to the broadcast address.

9. The packet relay method as claimed in claim 1, wherein the transferring of the packet includes acquiring first flag information corresponding to the common MPLS label added from a table associating the first flag information indicating from which direction of a device executing the packet relay method the packet added with the common MPLS label should be transferred to the ring network with the MPLS label common to destination clients corresponding to the multicast address or all destination clients corresponding to the broadcast address.

10. The packet relay method as claimed in claim 1, wherein the transferring of the packet includes determining a transferring direction of the packet added with the common MPLS label to the ring network, according to an arithmetic result obtained by performing hash function to at least one of the destination address and a unique address of the source client.

11. The packet relay method as claimed in claim 9, wherein the table further includes second flag information indicating whether or not a transferring direction of the packet added with the common MPLS label to the ring network should be determined according to a hash function performed to at least one of the destination address and a unique address of the source client; and
the transferring of the packet includes acquiring the first and the second flag information corresponding to the common MPLS label added, determining the transferring direction according to an arithmetic result of the hash function when the second flag information indicates that the transferring direction should be determined by the hash function while otherwise determining the transferring direction according to the first flag information.

12. The packet relay method as claimed in claim 10, wherein the a function different per each common MPLS label is used as the hash function.

13. The packet relay method as claimed in claim 6, further comprising updating or reading the table setting based on instructions from an external device.

14. The packet relay method as claimed in claim 1, further comprising sending statistic information of a packet transferred to the ring network to an external device.

15. The packet relay method as claimed in claim 2, further comprising sending statistic information of a packet received from the ring network to an external device.

16. A packet relay method comprising:
adding to a packet, when the packet having a multicast address or broadcast address set therein as a destination address is received from a source client, a common MPLS label which is an MPLS label common to destination clients corresponding to the multicast address or all destination clients corresponding to the broadcast address; and
transferring the packet added with the common MPLS label over a ring network, wherein
the transferring further includes adding to the packet having the common MPLS label added, a Resilient Packet Ring (RPR) header in which a source address, a destination address, a unique address of a device executing the packet relay method for an allowable lifetime on the ring network of the transferred packet, the multicast address or broadcast address, and a predetermined allowable lifetime are set, and
the adding comprises:
acquiring flag information and allowable lifetime corresponding to the common MPLS label added, from a table associating the MPLS label common to destination clients corresponding to the multicast address or all destination clients corresponding to the broadcast address, flag information indicating whether or not the packet added with the common MPLS label should be transferred from both directions of a device executing the packet relay method, and an allowable lifetime for each direction; and copying the packet added with the common MPLS label when the acquired flag information indicates that the transferring should be transferred from both directions and of adding the copied packet with the RPR header having each allowable lifetime set for each packet to be transferred from both directions.

17. A Resilient Packet Ring (RPR) node device comprising:
a table associating a multicast address or a broadcast address with a common MPLS label which is an MPLS label common to destination clients corresponding to the multicast address or all destination clients corresponding to the broadcast address;
a first means for adding to a packet, when the packet having the multicast address or the broadcast address set therein as a destination address is received from a source client, the MPLS label acquired from the table; and
a second means for transferring the packet added with the MPLS label over a ring network
wherein:
the second means further includes a third means for adding to the packet having the common MPLS label added, an RPR header in which a source address, a destination address, a unique address of a device executing a packet relay for an allowable lifetime on the ring network of the transferred packet, the multicast address or broadcast address, and a predetermined allowable lifetime are set;
the third means further includes a means for acquiring an allowable lifetime corresponding to the common MPLS label added at the first means, from a table associating the allowable lifetime with the MPLS label common to destination clients corresponding to the multicast address or all destination clients corresponding to the broadcast address;
the table further includes first flag information indicating whether or not the packet added with the common MPLS label should be transferred from which direction of a device executing a packet relay to the ring network, and second flag information indicating whether or not the transferring direction should be determined according to a hash function performed to at least one of the destination address and the unique address of the source client; and
the second means further includes a fourth means for acquiring from the table the first and the second flag information corresponding to the common MPLS label added at the first means, determining the transferring direction according to an arithmetic result of the hash function when the second flag information indicates that the transferring direction should be determined by the hash function while otherwise determining the transferring direction according to the first flag information.

18. The Resilient Packet Ring (RPR) node device as claimed in claim 17, comprising:
a table associating flag information indicating whether receiving the packet added with the common MPLS label common to the destination clients corresponding to the multicast address or all destination clients corresponding to the broadcast address from the ring network is valid with the MPLS label;
a fourth means for receiving the packet from a ring network; and
a fifth means for removing the MPLS label from the received packet to be transmitted to the destination clients when the flag information corresponding to the common MPLS label added to the received packet is detected as being valid from the table.

19. The RPR node device as claimed in claim 18, wherein the fourth means for further includes a sixth means for transferring the received packet to the ring network.

20. The RPR node device as claimed in claim 19, wherein the received packet is further added with an RPR header in which a source address, a destination address, a unique address of a device executing a packet relay for an allowable lifetime on the ring network of the transferred packet, the multicast address or broadcast address, and a predetermined allowable lifetime are set, and at the third means the received packet is not transferred to the ring network after the allowable lifetime within the RPR header reaches the predetermined allowable lifetime.

21. The RPR node device as claimed in claim 19, wherein the received packet is further added with an RPR header in which a source address, a destination address, a unique address of a device executing a packet relay for an allowable lifetime on the ring network of the transferred packet, the multicast address or broadcast address, and a predetermined allowable lifetime are set, and at the sixth means the received packet is discarded when a source address within the RPR header coincides with a unique address of a device executing a packet relay exceeds the predetermined allowable lifetime.

22. The RPR node device as claimed in claim 17, wherein the second means further includes means for transferring a packet added with the common MPLS label to the ring network when flag information corresponding to the common MPLS label added at the first means is detected as being valid from a table associating the flag information indicating whether or not transferring the packet added with the common MPLS label to the ring network is valid with the MPLS label common to destination clients corresponding to the multicast address or all destination clients corresponding to the broadcast address.

23. The RPR node device as claimed in claim 17, wherein the second means further includes means for acquiring first flag information corresponding to the common MPLS label added at the first means from a table associating the first flag information indicating from which direction of a device executing the packet relay device, the packet added with the common MPLS label should be transferred to the ring network with the MPLS label common to destination clients corresponding to the multicast address or all destination clients corresponding to the broadcast address.

24. The RPR node device as claimed in claim 17, wherein the second means further includes means for determining a transferring direction of the packet added with the common MPLS label to the ring network, according to an arithmetic result obtained by performing hash function to at least one of the destination address and a unique address of the source client.

25. The RPR node device as claimed in claim 23, wherein the table further includes second flag information indicating whether or not a transferring direction of the packet added with the common MPLS label to the ring network should be determined according to a hash function performed to at least one of the destination address and a unique address of the source client; and
the second means further includes means for acquiring the first and the second flag information corresponding to the common MPLS label added at the first means, determining the transferring direction according to an arithmetic result of the hash function when the second flag information indicates that the transferring direction should be determined by the hash function while otherwise determining the transferring direction according to the first flag information.

26. The RPR node device as claimed in claim 24, wherein the determining means comprising using a function different per each common MPLS label as the hash function.

27. The RPR node device as claimed in claim 17, further comprising means for updating or reading the table setting based on instructions from an external device.

28. The RPR node device as claimed in claim 17, further comprising means for sending statistic information of a packet transferred to the ring network to an external device.

29. The RPR node device as claimed in claim 18, further comprising means for sending statistic information of a packet received from the ring network to an external device.

30. A Resilient Packet Ring (RPR) node device comprising
  a table associating a multicast address or broadcast address with a common MPLS label which is an MPLS label common to destination clients corresponding to the multicast address or all destination clients corresponding to the broadcast address;
  a first means for adding to a packet, when the packet having the multicast address or broadcast address set therein as a destination address is received from a source client, the common MPLS label acquired from the table; and
  a second means for transferring the packet added with the common MPLS label over a ring network
  wherein:
    the second means further includes a third means for adding to the packet having the common MPLS label added, an RPR header in which a source address, a destination address, a unique address of a device executing a packet relay for an allowable lifetime on the ring network of the transferred packet, the multicast address or broadcast address, and a predetermined allowable lifetime are set, and
  the third means comprises:
    means for acquiring flag information and allowable lifetime corresponding to the common MPLS label added at the first means, from a table associating the MPLS label common to destination clients corresponding to the multicast address or all destination clients corresponding to the broadcast address, flag information indicating whether or not the packet added with the common MPLS label should be transferred from both directions of a device executing a packet relay, and an allowable lifetime for each direction; and
    means for copying the packet added with the common MPLS label when the acquired flag information indicates that the transferring should be transferred from both directions and of adding the copied packet with the RPR header having each allowable lifetime set for each packet to be transferred from both directions.

* * * * *

UNITED STATES PATENT AND TRADEMARK OFFICE
CERTIFICATE OF CORRECTION

PATENT NO. : 8,391,287 B2
APPLICATION NO. : 12/153894
DATED : March 5, 2013
INVENTOR(S) : Yasuyuki Mitsumori It is certified that error appears in the above-identified patent and that said Letters Patent is hereby corrected as shown below:

In the Claims

Column 18, Line 27, In Claim 12, delete "the a" and insert -- the --, therefor.
Column 20, Line 2, In Claim 19, after "fourth means" delete "for further".

Signed and Sealed this
Second Day of July, 2013

Teresa Stanek Rea
*Acting Director of the United States Patent and Trademark Office*